(12) United States Patent
Panec et al.

(10) Patent No.: US 11,057,236 B2
(45) Date of Patent: Jul. 6, 2021

(54) SYSTEMS AND METHODS FOR INTERACTIVE RESPONSES BY TOYS AND OTHER CONNECTED DEVICES

(71) Applicant: DISNEY ENTERPRISES, INC., Burbank, CA (US)

(72) Inventors: Timothy M. Panec, Studio City, CA (US); Stephen A. Thornton, Redondo Beach, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 12 days.

(21) Appl. No.: 16/243,542

(22) Filed: Jan. 9, 2019

(65) Prior Publication Data

US 2020/0358629 A1 Nov. 12, 2020

(51) Int. Cl.
*H04L 12/18* (2006.01)
*H04W 4/06* (2009.01)
(Continued)

(52) U.S. Cl.
CPC .......... *H04L 12/1881* (2013.01); *G08C 17/02* (2013.01); *H04W 4/06* (2013.01); *H04W 4/80* (2018.02); *G08C 2201/30* (2013.01)

(58) Field of Classification Search
CPC ...... H04L 12/1881; H04W 4/06; H04W 4/80; G08C 2201/30; G08C 17/02
See application file for complete search history.

(56) References Cited

U.S. PATENT DOCUMENTS 8,818,554 B2 * 8/2014 Lee ..................... H04M 1/7253
700/250
9,349,131 B2 * 5/2016 Ptucha ............... G06Q 30/0269
(Continued)

FOREIGN PATENT DOCUMENTS

KR       20010106652 A     12/2001
WO    WO2006110011 A1    10/2006
WO    WO2015133881 A1     9/2015

OTHER PUBLICATIONS

Ball.e—"The friend for children with autism"—2012 https://www.ulule.com/balle/.
(Continued)

*Primary Examiner* — Benjamin H Elliott, IV
(74) *Attorney, Agent, or Firm* — Noel Brandon Vasquez

(57) ABSTRACT

The present disclosure may be embodied in systems, methods, and computer readable media, and may allow for interactive responses by network-enabled objects, programs, and machines. Embodiments described are well-suited for communicating and responding using small-sized data messages, thus allowing for their implementation in standard messaging systems and by simple devices such as toys and other low-level electronic devices that may have limited processing capacity and/or memory. The present disclosure provides in one embodiment a method comprising receiving at least one broadcast message, each broadcast message in the at least one broadcast message comprising a plurality of identifiers and determining a highest priority identifier amongst the plurality of identifiers received in the at least one broadcast message. The method may further comprise identifying a command sequence associated with the highest priority identifier and executing the command sequence.

20 Claims, 7 Drawing Sheets

(51) Int. Cl.
*G08C 17/02* (2006.01)
*H04W 4/80* (2018.01)

(56) References Cited

U.S. PATENT DOCUMENTS

| | | | | |
|---|---|---|---|---|
| 9,613,310 | B2* | 4/2017 | Buibas | G06N 3/04 |
| 2007/0217586 | A1* | 9/2007 | Marti | H04M 19/04 |
| | | | | 379/201.01 |
| 2013/0229265 | A1* | 9/2013 | Sajadi | G06K 7/10297 |
| | | | | 340/10.3 |
| 2013/0322320 | A1* | 12/2013 | Lee | H04W 48/12 |
| | | | | 370/312 |
| 2014/0362749 | A1* | 12/2014 | Nakamoto | H04B 1/38 |
| | | | | 370/310 |
| 2015/0009116 | A1* | 1/2015 | Mangold | G06F 3/017 |
| | | | | 345/156 |
| 2015/0238879 | A1* | 8/2015 | Wu | A63H 30/04 |
| | | | | 446/484 |
| 2016/0121487 | A1* | 5/2016 | Mohan | H04L 67/34 |
| | | | | 700/248 |
| 2016/0188181 | A1* | 6/2016 | Smith | G06F 3/04883 |
| | | | | 715/765 |
| 2016/0243455 | A1* | 8/2016 | Nave | G06F 3/048 |
| 2016/0381510 | A1* | 12/2016 | Reynolds | H04B 17/318 |
| | | | | 455/456.1 |
| 2017/0076194 | A1* | 3/2017 | Versace | G06N 3/08 |
| 2017/0120446 | A1* | 5/2017 | Veltrop | B25J 9/1661 |
| 2017/0220940 | A1* | 8/2017 | Shaashua | G06N 7/005 |
| 2017/0245204 | A1* | 8/2017 | Kumar | H04W 48/16 |
| 2018/0090127 | A1* | 3/2018 | Hofer | G10L 25/87 |
| 2018/0122266 | A1* | 5/2018 | Azartash | G09B 5/04 |
| 2018/0144649 | A1* | 5/2018 | el Kaliouby | G06F 16/337 |
| 2018/0176727 | A1* | 6/2018 | Williams | A61B 5/747 |
| 2018/0279093 | A1* | 9/2018 | Do | H04W 4/21 |
| 2019/0053259 | A1* | 2/2019 | Kandhalu Raghu | |
| | | | | H04W 72/1263 |
| 2019/0118104 | A1* | 4/2019 | Su | A63H 3/36 |
| 2019/0240842 | A1* | 8/2019 | Hsu | G06F 3/0304 |
| 2019/0246353 | A1* | 8/2019 | Jensen | H04L 67/12 |
| 2020/0260228 | A1* | 8/2020 | Arunachalam | H04W 4/021 |
| 2020/0280380 | A9* | 9/2020 | Daoura | H04W 12/0013 |
| 2020/0358629 | A1* | 11/2020 | Panec | H04W 4/06 |

OTHER PUBLICATIONS

From Cozmo to Vector: How Anki Designs Robots with Emotional Intelligence; Aug. 21, 2018; Chris Wiltz; Electronics & TestSensors, Artificial Intelligence, Consumer Electronics.
Learning User Models with Limited Reinforcement: An Adaptive Human-Robot Interaction System; Finale Doshi & Nicholas Roy.
Reinforcement Learning Explained; Dec. 8, 2016; Junling Hu; O'Reilly Media, Inc.
NXT User Guide; 2006; Mindstorms Education, The LEGO Group; https://www.generationrobots.com/media/Lego-Mindstorms-NXT-Education-Kit.pdf.
Vortex—An Arduino Based Programmable Toy Robot for Kid; 2018; Thingbits Electronics Pvt Ltd.; https://www.thingbits.net/products/vortex-an-ardu ino-based-programmable-toy-rob.
Mi Robot Builder; 2018; Xiaomi; https://www.mi.com/us/toyblock.

* cited by examiner

| | Input Type 301 | Input ID 302 | Comm. Seq ID 303 | Command Seq / Action 304 | Reinforcement Value 305 | Last Update 306 | Count 307 |
|---|---|---|---|---|---|---|---|
| 310 | Broadcast | x03 x02 - 'Fairy Tale', 'Princess' | 3 | 'Emit Blue', 'Princess Greet' | 0.9 | 1:02:08 | 1 |
| | Broadcast | x03 x02 x05 - 'Fairy Tale', 'Witch', 'Witch no. 5' | 2 | 'Flashing light', 'Shriek', 'Flee' | 0.1 | 23:04:01 | 2 |
| 320 | Broadcast | x03 x02 x02 – 'Fairy Tale', 'Princess', 'No. 2' | 1 | 'Emit Red', 'Hi, Princess no. 2' | 0.8 | 3:44:21 | 8 |
| 330 | Gesture | 'Wave' | 4 | 'Ask (broadcast request)' | 1 | 00:00:00 | 0 |
| 340 | Touch | 'Belly Rub' | 5 | 'Weak Roar' | 1 | 0:00:00 | 0 |
| | Touch | 'Belly Rub' | 6 | 'Strong Roar' | 0 | 0:00:00 | 0 |
| | Image | 'Castle' | 9 | 'fade lights', 'turn on motor', 'play audio' | 0.99 | 1:03:43 | 3 |
| | Audio | 'End Credit Music' | 2 | 'turn on lights', 'wait', 'execute seq 4' | 0.5 | 1:43:44 | 4 |
| 350 | Image | 'Face Rec: User X' | 32 | 'Run up to User X', 'Wag tail' | 0.01 | 22:21:22 | 99 |
| 360 | Broadcast | x03 x54 x01 x02 x01 | 8 | 'wait', 'execute seq 4', 'wait', 'execute seq 1', 'repeat' | 1 | 21:21:21 | 1 |
| 370 | Broadcast | x03 x05 x44 x01 x82 x08 | 300 | 'Flash LEDs 4x – delay 2000 ms', 'motor - power = 10', 'play audio id X', 'wait 0.1 s | 1 | 11:11:11 | 1 |

FIG. 3

SYSTEMS AND METHODS FOR INTERACTIVE RESPONSES BY TOYS AND OTHER CONNECTED DEVICES

BACKGROUND

In today's technological environment, everyday physical items can be fitted with electronic components, such as processors, memory devices, communication antennas, and sensors. These electronic components may allow these physical items to connect over networks and process information as connected devices. In some instances, the ability to send, receive, and process information may allow these physical items to provide greater utility. For example, a smart fridge might be able to order groceries, a smart watch might be able to track a user's sleeping habits, etc. These devices might be programmed to interact with the user, and with one another, in useful ways, such as for optimizing the performance of tasks and the like. However, their ability to respond in entertaining and interactive ways is often limited. In other words, although these devices may act in an intelligently useful manner, they nonetheless behave like life-less machines.

Connected devices typically run on a standard communication protocol. This ensures that messages are uniquely conveyed for each task and can be readily understood by each device as intended. However, these protocols also set constraints that limit flexibility in programming, especially with respect to available memory. Standard short-distance messages especially are of limited size. At the same time, a considerable amount of memory is required to generate a unique identifier for each command or for each identifiable entity. As such, traditional unique identifiers (UUIDs), usually take up a considerable portion of a data message. For example, a standard BLE advertising message contains a data payload of about 31 bytes in size, of which, usually only 20 bytes are actually available for communicating a particular command. Meanwhile, each UUID requires at least 128 bits (16 bytes) of storage. In prior systems, this limited the amount of information that could be conveyed between devices, and placed further limits on a device's ability to give more nuanced and interactive responses.

SUMMARY

The present disclosure provides in one embodiment a method. The method comprising receiving at least one broadcast message, each broadcast message in the at least one broadcast message comprising a plurality of identifiers and determining a highest priority identifier amongst the plurality of identifiers received in the at least one broadcast message. The method may further comprise identifying a command sequence associated with the highest priority identifier and executing the command sequence.

In some embodiments, determining the highest priority identifier comprises identifying a packlet in the at least one broadcast message, parsing the packlet into the plurality of identifiers, comparing a format of the plurality of identifiers in the packlet to a predefined hierarchy, and determining the highest priority identifier amongst the plurality of identifiers based on the comparison of the plurality of identifiers to the predefined hierarchy. At least one broadcast message can be a standard short-distance advertising message. Each identifier can be stored as an allocated set of bits contained in merchant-specific data fields, and the highest priority identifier can be determined based on a level of information specificity associated with each identifier, where the plurality of identifiers comprises one or more of a brand identifier, a franchise identifier, a character archetype identifier, a family identifier, a character identifier, and an interactor type identifier.

In another embodiment, the present disclosure provides an interactive response system comprising at least one processor, network interface, and a non-transitory computer readable medium storing instructions. The instructions can include methods of receiving at least one broadcast message, each broadcast message in the at least one broadcast message comprising a plurality of identifiers and determining a highest priority identifier amongst the plurality of identifiers received in the at least one broadcast message. The instructions can further include identifying a command sequence associated with the highest priority identifier and executing the command sequence.

In a further embodiment, the present disclosure provides yet another method. The method comprising of sensing a user input, sending an advertising message requesting an appropriate action relating to the user input, and receiving one or more response messages in response to the advertising message requesting the appropriate action. Each response message in the one or more response messages may specify at least a command sequence identifier and an associated reinforcement value, and the method can further include applying at least one of the command sequence identifiers and its associated reinforcement value to a predefined policy to determine a highest priority command sequence identifier and initiating a command sequence associated with the highest priority command sequence identifier as the appropriate action.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

FIG. 3 shows a depiction of programmable instructions according to an embodiment.

DETAILED DESCRIPTION

Figure 1:
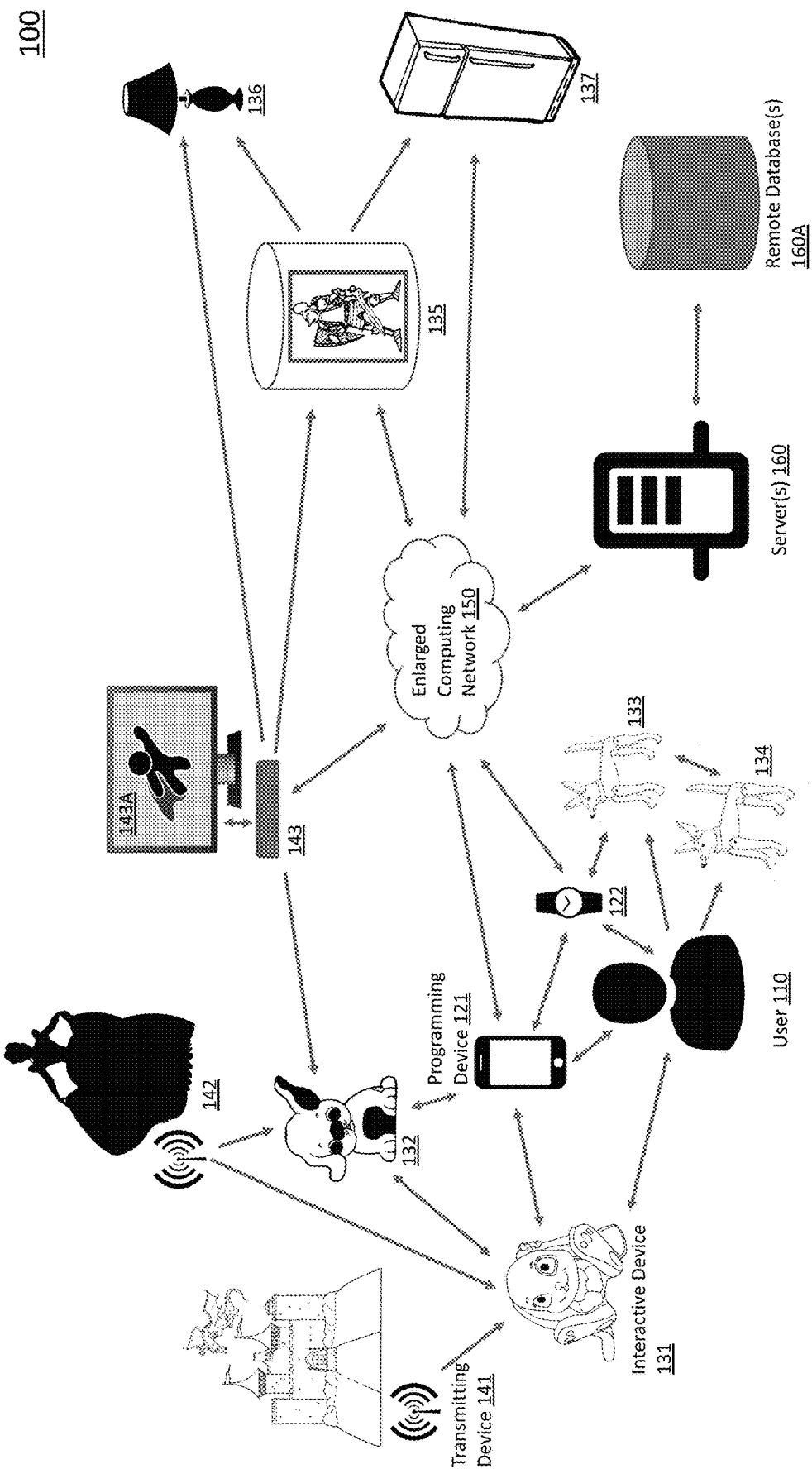
FIG. 1 shows an illustration of a system according to embodiments.

As described above, network-enabled objects can perform specialized utility-based tasks, but lack the ability to respond to input in an interactive manner. Furthermore, standard data messages between objects are typically limited in memory size and the objects often have limited memory and processing power. The present disclosure may be embodied in systems, methods, and computer readable media, and may allow for interactive responses by inanimate objects, programs, and machines, such as by toys, virtual assistants, animatronics, appliances, and the like. Furthermore, the embodiments described are well-suited for communicating and responding using small-sized data messages, thus allowing for their implementation in standard messaging systems and by simple devices such as toys and other low-level electronic devices that may have limited processing capacity and/or memory.

Embodiments of the invention may involve the communication of information between items over a personal area network. Using the programming and messaging techniques described herein, items can sense and interact with their environment, which can include other network-enabled items configured to interact with one another. For example, toys can be programmed to output interactive responses that correspond to characters, persons, and other toys within their presence. This may give the illusion of the toys being alive and aware of their own environment, and may provide for greater interactivity and entertainment. The programming and messaging techniques can also be incorporated in other connected devices, such as connected home devices, media devices, and virtual assistants. For example, character-based virtual assistants rendered as video and/or audio relating to a particular character from a storybook, TV show, or film may be programmed to sense the presence of users, toys, devices, and/or other rendered characters.

In other embodiments, a response system may also be programmed to respond to specific content executed by a media player, such as video content containing a particular type of scene, character, or content that is specific to a particular movie franchise. As an example, a toy can be programmed to respond in a fearful manner when the first instance of a villain appears in content. As another example, a virtually rendered character can be programmed to dance when a scene contains music or laugh when a joke has been told. These examples may give the impression that the user's toys or virtual assistants are engaged in content or may be watching along with the user. In yet another example, a connected lighting system may be programmed to produce a particular lighting configuration when a scene depicts a particular setting, such as a scene taking place in a jungle, desert, outer space, under water, during a thunder storm, etc. These and other interactive responses may provide greater entertainment value when viewing content, and are enabled by embodiments of the invention described herein.

According to embodiments, behaviors can be expressed as command sequences that may be customizable and programmable by a user. In some embodiments, command sequence programming can be carried out using a network-enabled handheld device, such as a smart phone or tablet. The network-enabled handheld device may be capable of connecting to and programming the response system through an application, which in some embodiments may retrieve available responses from a remote server or database. In other embodiments, these behaviors can be programmed and/or finetuned by a user through reinforcement or other feedback. Finetuning and reinforcement can also be programmed for multiple devices as a group. In certain embodiments, devices in a group can ask each other for advice on how to respond to a user's liking. In some instances, this may emulate the behavior of mimicking, observing, or learning from one another. For example, the response system may take the form of a group of pet toys that can collectively learn reinforced behavior for receiving praise, treats, belly-rubs, petting by the user, etc.

Further described are receiving and transmitting devices provided by embodiments. Transmitting devices in various embodiments may be configured to send identifiable information that an interactive device is configured to respond to. For example, the transmitting device can be a device worn by a costumed person or fitted to an animatronic character present at a theme park. The transmitting device may be configured to broadcast messages to other characters in its vicinity over the personal area network, and in a format that they may generally understand. In other examples, the transmitting device can be a media player capable of sending response cues to interactive devices during media playback.

Prior to further discussing embodiments in greater detail, it may be useful to discuss a few terms and definitions.

A "connected device" may refer to an object, device, or other item capable of network connectivity. This can include communication capabilities of global, regional, local, or personal area networks. The term "connected device" is often used in the context of "Internet-of-things" or "IOT", in which "dumb" or traditionally non-network enabled physical items and everyday objects are now connected over networks, so as to interact and exchange data.

A "toy" may refer to a physical object intended for children to play with. Typically, toys take the form of miniature replicas of another physical object, such as in the case of a toy pet, doll, car, etc. A toy can also be a "character-based toy", in which the toy's physical appearance and/or other characteristics embody a character from a particular story and/or franchise.

A "virtual assistant" or in some instances "AI assistant" or "digital assistant" may refer to an application program or other computing program for intelligently performing tasks for a user. The tasks can be initiated and executed through the processing of natural language, for example, in the form of spoken voice commands by the user. A virtual assistant can be rendered or expressed using output devices, such as displays and/or speakers. For example, an AI assistant can have a virtual appearance that is rendered on a screen, or a particular voice that is expressed in audio. A "character-based virtual assistant" may refer to an AI assistant that is rendered or expressed as a particular character, such as a character from a particular story and/or franchise.

A "wireless personal area network" or simply a "personal area network" may refer to a network of computing devices in which a data transmission between nearby computing devices is provided. This can include data transmissions via a short-distance wavelength radio wave. A "short-distance wireless message" may refer to ultra-high frequency (UHF) wireless messages (e.g., radio frequencies ranging between 300 megahertz and 3 gigahertz) that are intended for transmitting data over relatively short distances. This can include, for example, ISM band wireless messages of a standard format or specific IEEE 802 (e.g., IEEE 802.15) standard format, such as a standard Bluetooth, Bluetooth Low Energy (BLE), IrDA, Wireless USB, Zigbee, among others.

An "advertising message" or "advertisement" may refer to a data message that can be transmitted to devices as a broadcast. This may include broadcast functions for sending messages to other devices that are nearby (e.g., within a range that is less than 15-40 meters away). An advertisement may further include broadcast messages where pairing between devices may not be required, such as, for example, a Bluetooth 1-Broadcasting message. In an advertising message, a broadcaster can send data along with one or more identifiers that may be recognizable by a receiving device. In some instances, an advertising message may be of a beacon protocol, such as iBeacon, AltBeacon, Eddystone, etc.

An "identifier" may refer to a sequence of characters/symbols to identify an element, program, variable, or piece of data, and especially in a format that may be understood and processed by a computer. This may include, for example, bit strings, binary strings, numeric strings, alphanumeric strings, hexadecimal numerals, etc. References to identifiers may be related to "unique identifiers", where an identifier can be associated with a single object, single entity, or single type of object/entity. In some instances, an identifier may be an allocated field or portion of a unique identifier based on a predefined format or convention. For example, an identifier can be one or more allocated bits in an array or other data structure that a unique identifier may occupy. As referred to in the art, one type of standard unique identifier is a "universally unique identifier (UUID)", which may refer to a 128-bit number that when generated according to a standard method is guaranteed to be, for all practical purposes, unique without any dependence of uniqueness on a particular registration authority (i.e. globally unique).

A "packlet" may refer to a specific data packet or type of data packet that is structured in a data message according to a predefined format suitable for a specific use case. In the context of advertising or beaconing, this may take the form of an allocated packet of data or allocated set of bits that are transmitted amongst a plurality of data payloads in a transmission. For example, in a BLE standard advertising message, a payload can contain merchant-specific data where identifiers are stored as bit arrays or bit strings. The first portion of bits or leading bit sets can denote preamble information such as company identifiers and packlet types, and the remaining bit sets can denote predefined information when compared against formats specified for the preamble information.

A "company identifier" may refer to a unique identifier, or portion thereof, that indicates a specific company. For example, a company identifier can be at least a portion of a UUID that is assigned to a specific Bluetooth SIG member for the purpose of BLE beaconing. By some conventions, company identifiers are included as a first portion of a manufacturer specific data field, so as to convey that information in remaining fields are formatted according to the specific company's specifications.

A "highest priority identifier" may refer to identifier that takes precedence over other identifiers that are evaluated. This may be an evaluation with respect to a specific process or evaluation policy. Highest priority can be evaluated with respect to various predefined conditions or rules depending on a specific situation that is anticipated. For example, highest priority can be evaluated based on a level of information specificity or hierarchy associated with elements in a given data message or based on a determination that certain responses are confirmed from feedback to be more desirable over others.

A "hierarchy" may refer to a system or semantic structure that is organized according to levels or rankings. As examples, this can include rankings based on a level of importance or based on a level of information specificity. In a particular example, a hierarchy based on levels of information specificity may have a brand of an entertainment company at the top of the hierarchy, followed by a specific movie franchise of the brand at a next level in the hierarchy, followed by a specific character type, character archetype, or character group/family in the movie franchise, followed by a specific character or individual person, etc. In some hierarchal systems, multiple entities and/or multiple types of entities can be organized on the same level in the hierarchy. Following the previous example, underneath 'brand' in the hierarchy, 'movie franchise' might be placed at the same level in the hierarchy as a 'device type'. Underneath that level, 'interactor type' might be placed on the same level as 'character type', and similarly, 'character' might be placed on the same level as a specific 'actor' or Interactor in the hierarchy.

A "brand" may refer to a particular company name or the name of a subsidiary under a parent company. For example, a brand can be the name of a specific motion picture studio, production company, animation studio, computer graphics studio, special effects company, television network, among others. In other examples, a brand can be a specific device manufacturer, designer, content creator, etc. In the context of sending data between network-enabled products, a brand can be identified in a message using a "brand identifier" or "ownership identifier".

A "franchise" may refer to a general title or concept used for creating or marketing a series of products, such as those relating to films or television shows. For example, a franchise may be related to a series of movies following a particular set of characters, such a characters in a specific fictional universe. The fictional universe can be, for example, that of a specific fairytale, science fiction, or superhero universe. In the context of sending data between network-enabled products, a franchise can be identified in a message using a "franchise identifier".

A "family" may refer to a group whose members share a significant characteristic. In the context of characters in a franchise, a family may refer to a group of characters. For example, a family or group of fictional characters can be 'Team A', which in a specific movie battles against another family of characters, 'Team B.' Traditionally, this might refer to character groups that fall under "good side", "evil side", or possibly "neutral side." In a data message, a family or group of characters can be identified using a "family identifier".

An "archetype" may refer to a very typical example of a certain person or thing. In the context of storytelling, a "character archetype" may refer to an original pattern of characteristics from which similar characters can be modeled, copied, or derived from. This may include characteristics relating to specific goals, talents, flaws, desires, and other distinctly human traits used to represent fundamental motifs in a given story. For example, character archetypes might include various types of protagonists and antagonists, such as 'hero', 'anti-hero', and 'villain' or 'princess', 'witch', and 'knight', etc. As other examples, character archetypes might include 'rebellious teen', 'joyful baby', 'nurturing mother', 'father figure', 'watchful godmother', 'disheveled mentor', 'clumsy hero', 'intelligent master', 'wise advisor', 'jokester', 'prankster', to name a few. In a data message, an archetype or character archetype can be identified using an "archetype identifier", "archetype group identifier", or simply "group identifier".

An "interactor type" may refer to a type of entity involved in an interaction. In the context of an interactive response system, an interactor type might signify what kind of entity the response system is responding to. As examples, the interactor type might be 'human' if the entity is a human being whose presence is sensed by the response system or 'toy' if the entity is a toy object that is detected to be in proximity. Other interactor types might include 'device', 'media player', 'animatronic', 'character costume', 'video', 'audio', 'vehicle', 'watch', 'lighting system', 'appliance', 'soft toy', 'mechanical toy', 'virtual character/toy', to name a few examples. Interactor types relating to a type of hardware interactor can be referred to as "hardware types".

In a data message, an interactor type can be identified using an "interactor type identifier" or "hardware type identifier."

A "reinforcement value" may refer to a value or parameter that affects the probability of an action being repeated by a program. For example, higher reinforcement values associated with an action may correspond to a higher probability of the action being repeated by the program. Reinforcement values can be adjusted by a computing program based on sensed feedback. A reinforcement value can be increased, decreased, or remain the same after feedback for an action has been received. These actions can take the form of a set of commands or range of command sequences that are available to choose from, given a particular event or stimuli that the computing program can react to. In turn, reinforcement values associated with each action can be referenced by a response system to make decisions based on past experiences. As an example, upon sensing the presence of a user, a response system may evaluate reinforcement values for 10 possible ways to greet the user, and may use the reinforcement values to pick a greeting that has elicited the most positive response from the user during past encounters. For example, the action associated with the highest reinforcement value in comparison to the others can be selected, or, each reinforcement value can act as a weight relating to the probability that an action will be performed or not performed.

A "reinforcement request message" may refer to a broadcast message or advertising message requesting reinforcement information. A reply to the reinforcement request message can be an identified command sequence selected/voted as a response to a particular input. The reply to a reinforcement request message can be a "reinforcement response message" which may include a command sequence identifier and associated reinforcement value, as well as any other relevant information such as timestamps and counters.

A "voting system" may refer to a system or procedure in which indications of choice (i.e., votes) are aggregated, counted, and evaluated against rules, policies, and/or procedures to make decisions. As an example, for a system of computing devices deciding on commands to execute, a voting system may refer to a procedure in which the devices submit selections for commands/command sequences as votes, which are then counted to determine the preferred commands or "winner".

"Metadata" may refer to a set of data that describes and gives information about other data. For a given data file, metadata is provided in a header or some other allocated portion of the data. The allocation may be specified according to a predefined format so that programs may understand what each portion of the metadata signifies. As an example, for a given media file, metadata can include a title, duration, and other important descriptions of the media file and its content.

Moving on to a detailed description of the invention and specific embodiments, FIG. 1 shows a diagram of an exemplary system. As shown, the arrows may signify the communication of data over one or more networks, such as personal area networks, broadcast messaging systems, WiFi, near-field communications, radio-frequency identification, and the like. System 100 comprises a plurality of connected devices. These may include interactive devices 131, 132, 133, 134, 135, 136, and 137, which can be various toys or devices for providing some form of interactivity. For example, devices 131 and 132 may be interactive stuffed animals or character-based toys, devices 133 and 134 may be robotic pets, device 135 may be a smart speaker or connected home device, device 136 may be a connected light or lighting system, and device 137 may be an appliance, vehicle, or other utility-based machine. The connected devices may further include transmitting devices 141, 142, 143, and 143A for broadcasting commands and other uniquely identifiable information. For example, devices 141 and 142 may be Bluetooth transmission devices at a theme park and device 143 can be a Bluetooth enabled media player. These are just a few examples, and it should be understood that the connected devices shown in FIG. 1 are provided for illustrative purposes in describing the invention. The number of connected devices and types of connected devices included as part of system 100 may be different from those shown in FIG. 1 in other embodiments.

System 100 further comprises one or more programming devices, such as programming device 121 and 122. A programming device can be a handheld, wearable, or any other user-operable device of the user 110. For example, programming device 121 and 122 may be a smart phone and smart watch of user 110 respectively. Other examples of suitable programming devices can include tablet computers, laptops, desktop computers, to name a few. In other examples, a programming device may be integrated as a part of an interactive device, such as in the case of an appliance interface, vehicle interface, or other integrated machine interface. The one or more programming devices may be used to program and customize responses between transmitting devices and interactive devices. These can include responses to various types of inputs that an interactive device is configured to sense. The inputs can include automatic, non-user related inputs, such as wireless broadcasts, detectable images/video, and detectable audio. The inputs can also include user-related/user-initiated inputs, such as touch inputs, spoken audio inputs, recognized user behaviors, recognized user biometric information, etc.

In embodiments, the user 110 may use an application stored on programming device 121 to send programming messages to interactive device 131. The programming messages may specify a sequence of commands to associate with a particular identifier receivable in a data message or to associate with a particular input that can be sensed and/or recognized by the interactive device. For example, the application may provide a graphical user interface that allows the user to choose and make selections as to how interactive device 131 responds to uniquely identifiable entities, uniquely identifiable activities and behavior of said entities, and/or uniquely identified types of content.

Selections made by user 110 can be translated as programming messages by a programming device for transmission to an interactive device. For example, programming device 121 can send programming instructions to interactive device 131 that interactive device 131 is configured to process and store in memory. Selections may take the form of a mapping of uniquely identifiable inputs to uniquely identifiable outputs. In one embodiment, these selections may be specific to the particular interactive device/toy at the time of manufacture. For example, a toy can be manufactured to respond to a set of input identifiers associated with the same brand. In another embodiment, new identifiers can be made available at later point in time in a substantially unlimited fashion, so as to provide an updated set of available programming. For example, the programming device 121 may download identifiers for new characters or for other new content that did not exist at the time the toy was produced. The identifiers can be retrieved from server(s) 160 configured to access remote database(s) 160A where the identifiers are stored. The server(s) 160 may be accessible by the programming device over enlarged computing network 150, which can be a large area network or global network, such as the internet.

With respect to programmable device outputs, programming devices 121 and 122 may present to user 110 a set of commands that can be arranged in sequence by the user for assignment to a particular input. Available sets of commands can be specific to the output capabilities of the interactive device. As one example, interactive device 131 may comprise one or more LED lights as well as a speaker for outputting audio, and the available set of commands may include specific LED blinking patterns or color patterns as well as a set of predefined audio outputs, such as sound bites relating to a character of interactive device 131. In another example, interactive devices 133 and 134 may include motors for actuating predefined sets of movement, and the available set of commands can relate to parameters of motor operation, such as timing, rotation speed, direction, etc. In yet another example, interactive device 135 may include a display device and a speaker, and the available set of commands may relate to instructions for rendering specific images and generating specific types of audio signals or for outputting specific audio clips. In some embodiments, a programming device may convey selectable command sequences to the user 110 as semantic commands that can be translated by the interactive device as specific output functions. For example, the semantic commands for interactive device 133 and 134 can include instructions such as 'play', 'fetch', 'roll over', which microcontrollers of interactive devices 133 and 134 can translate into executable motor functions. It is noted that in some embodiments, one or more input-response combinations may already be preprogrammed in an interactive device by a manufacturer of the interactive device rather than by the user 110.

In certain embodiments, identifiers can be delivered to interactive devices by a transmitting device as a broadcast message or beacon that allows nearby interactive devices to be aware of its presence. The interactive devices can respond based on an association between input identifiers and command sequence identifiers programmed in memory. In embodiments, allocated portions of the broadcast message can denote specific information when arranged in a particular format. For example, transmitting device 141 may broadcast an advertising message containing a set of identifiers where a first set of bits relate to its interactor type (e.g. 'landmark') and a second set of bits relate to its grouping (e.g. 'castle'). Similarly, transmitting device 142 may broadcast an advertising message containing identifiers where a first set of bits denote an interactor type (e.g. 'person'), a second set of bits denote a specific franchise (e.g. 'fairytale universe'), and a last set of bits denote a specific grouping within the franchise (e.g. 'princess').

In a transmitted beacon, the plurality of identifiers can be formatted as allocated bits within merchant-specific data fields. The allocated portions can be contained as a packlet having a predefined bit format with which varying types of information can be stored in each allocated field. As such, each entity can identify itself to an interactive device according to multiple levels of identifiable information. In embodiments, the values of each allocated set of bits in the packlet can be compared to a predefined policy for prioritizing each bit of information contained therein. In one embodiment, this may include a policy where each set of bits in the bit format is associated with a particular level of information specificity in a hierarchy. The interactive device can be configured to prioritize responses associated with bit sets ranked as more specific in the hierarchy over bit sets that are ranked as less specific. For example, interactive device 131 may be programmed to respond to a bit set for 'landmark' with 'LED blink red' and may also be programmed to respond to a bit set for 'castle' with 'LED blink blue'. In a scenario where the hierarchy ranks grouping as more specific than interactor type, interactive device 131 will then execute the command 'LED blink blue' when receiving a beacon identifying both an interactor type of 'landmark' and a grouping of 'castle', as 'castle' is ranked as more specific information. In some embodiments, a hierarchy can be communicated through a format in which an order or position of a given data field in a packlet signifies its level of information specificity. For example, a packlet can be read from left to right, and each data field or bit set within the packlet progresses from a less specific to a more specific set of bits, with the right most data field or bit set containing the most specific information. The bits can be expressed in binary or hexadecimal, and can be ordered according to a big-endian byte order or little-endian depending on preference or to suit the particular implementation.

In another embodiment, the predefined policy may be one in which at least one set of bits in the bit format is associated with a reinforcement value, and the interactive device is configured to prioritize responding to higher reinforced bit sets over lower reinforced bit sets. The reinforcement values may be a score or other value type relating to probability. These reinforcement values can be adjusted by an interactive device when a sensed user reaction to an executed action or command sequence is recognized as positive or negative. Reinforcement may be of particular importance when responding specifically to user inputs detected by the interactive device's sensors, which in various embodiments, an interactive device may be capable of recognizing and identifying from sensor data or from features thereof. For example, interactive device 134 may sense a user input corresponding to a gesture of user 110. Interactive device 134 may have a range of choices or range of possible command sequences to execute that are associated with the user input. In other words, the specific gesture identified may be linked to more than one executable command sequence in interactive device 134's memory. Each command sequence in the range of possible command sequences may be associated with a unique command sequence ID and a reinforcement value. Upon identifying the user input, interactive device 134 may select the command sequence ID associated with the greatest reinforcement value to execute in response. Interactive device 134 may then evaluate the user 110's response to the execution of the sequence to determine if his or her reaction is positive or negative. For example, interactive device 134 may register the user stopping the gesture and speaking praise as positive and may register the user continuing the gesture more aggressively as negative. Based on the evaluation of the user's response, interactive device 134 can adjust the reinforcement value of the executed sequence, which may affect the device's chosen response when the same user input is repeated at a later point in time.

In various embodiments, the interactive device 134 may be programmed to recognize a positive or negative reaction from the user from sensor data. In one implementation, the interactive device 134 may store in memory an association between sensor measurement values and positive, negative, and/or neutral reactions. As an example, for a reaction sensed by a touch sensor of the interactive device 134, a touch having an impact, pressure, or force value that is above a predefined threshold or within a predefined range may be considered negative (e.g. forceful user hit) while values below the predefined threshold or outside of the predefined range may be considered positive (e.g. pleasant tap, rubbing, petting, or pat on the back). In other examples, the interactive device may be programmed to use image recognition to determine a frown vs a smile, or may use audio recognition to determine angry, happy, sad tones of voice.

In other embodiments, the predefined policy can also include an option to "ask" other devices what command sequence to execute, which may be a determination based on reinforcement values evaluated by each of the other devices. For example, interactive device 134 can broadcast a request that is received by interactive device 131, 132, and 133. Each of interactive device 131, 132, and 133 then sends a response to interactive device 134 comprising a command sequence ID and associated reinforcement value, as well as other data elements that can be used as evaluation criteria, such as timestamps and counters associated with a given command sequence ID. Interactive device 134 receives the responses and compares contained information therein to determine which command sequence ID to execute. The determination can be based on a predetermined rule or system governing the evaluation criteria. In one implementation, this may take the form of a weighted voting system, where each device that submits a response gets a vote for its selected command sequence ID multiplied/weighted by its reinforcement value. For example, interactive device 131 may vote 'CMD SEQ 1: reinforcement value 0.5', device 132 may vote 'CMD SEQ 2: reinforcement value 0.9', and device 133 may vote 'CMD SEQ 1: reinforcement value 0.5'. In this embodiment, the votes would be counted as 'CMD SEQ 1: 0.5+0.5=1'; 'CMD SEQ 2: 0.9'; 'Winner=CMD SEQ 1', and interactive device 134 would execute CMD SEQ 1. In other embodiments, other information contained in reinforcement responses, such as a counters and timestamps can be considered in the determination of a winning response. For example, the evaluation criteria for votes can further be weighted towards sequences that have been performed and evaluated (with respect to reinforcement value) multiple times. As another example, the evaluation criteria can also be weighted favorably towards recently executed, recently evaluated command sequences, as opposed to sequences that have not been executed in a while or that have not received a reinforcement value update in a long time. It is noted that a number of various rules or voting systems can be implemented, such as an unweighted one device-one vote policy, highest reinforcement value policy, highest minimum reinforcement value, highest reinforcement value amongst recently updated (timestamp later than time=t), highest reinforcement value with at least 'n' number of executions (count>n−1), etc.

In some embodiments, a predefined policy for evaluating inputs and responding can include considerations based on both information specificity/hierarchy and reinforcement values. For example, interactive device 132 may have a policy for evaluating beacon inputs based on hierarchy and evaluating sensed user inputs (e.g. touch, body/facial gesture, etc.) based on reinforcement. As another example, interactive device 135 may have a policy for first evaluating an input based on hierarchy, and if more than one choice still exists, execute the choice with the highest reinforcement value. Policies for determining highest priority responses as well as criteria for evaluating and adjusting reinforcement values may be tuned to the liking of one skilled in the art. For example, weighting parameters and other conditions may be selectively chosen by the manufacturer or content creator to best fit the particular use of the interactive device or to provide a particular experience to the user 110.

In yet another embodiment, additional criteria may be used by an interactive device to determine if and/or how to respond to one or more inputs. In one implementation, the additional criteria may include a signal strength criteria. For example, the interactive device may be programmed to only respond when a received signal strength indicator (RSSI) is above a predefined threshold, or may be programmed to respond to or prioritize the message with the highest powered signal received when multiple signals have been received over a short period of time. In another implementation, the additional criteria may include a recency of last similar response criteria. For example, the interactive device may be programmed to prioritize types of responses which have not been executed in a while. Evaluating a last similar response criteria may include evaluating timestamps associated with each response and determining which types of responses have been executed within a predefined window of time or which types of responses have not been executed within the predefined window of time.

Figure 2:
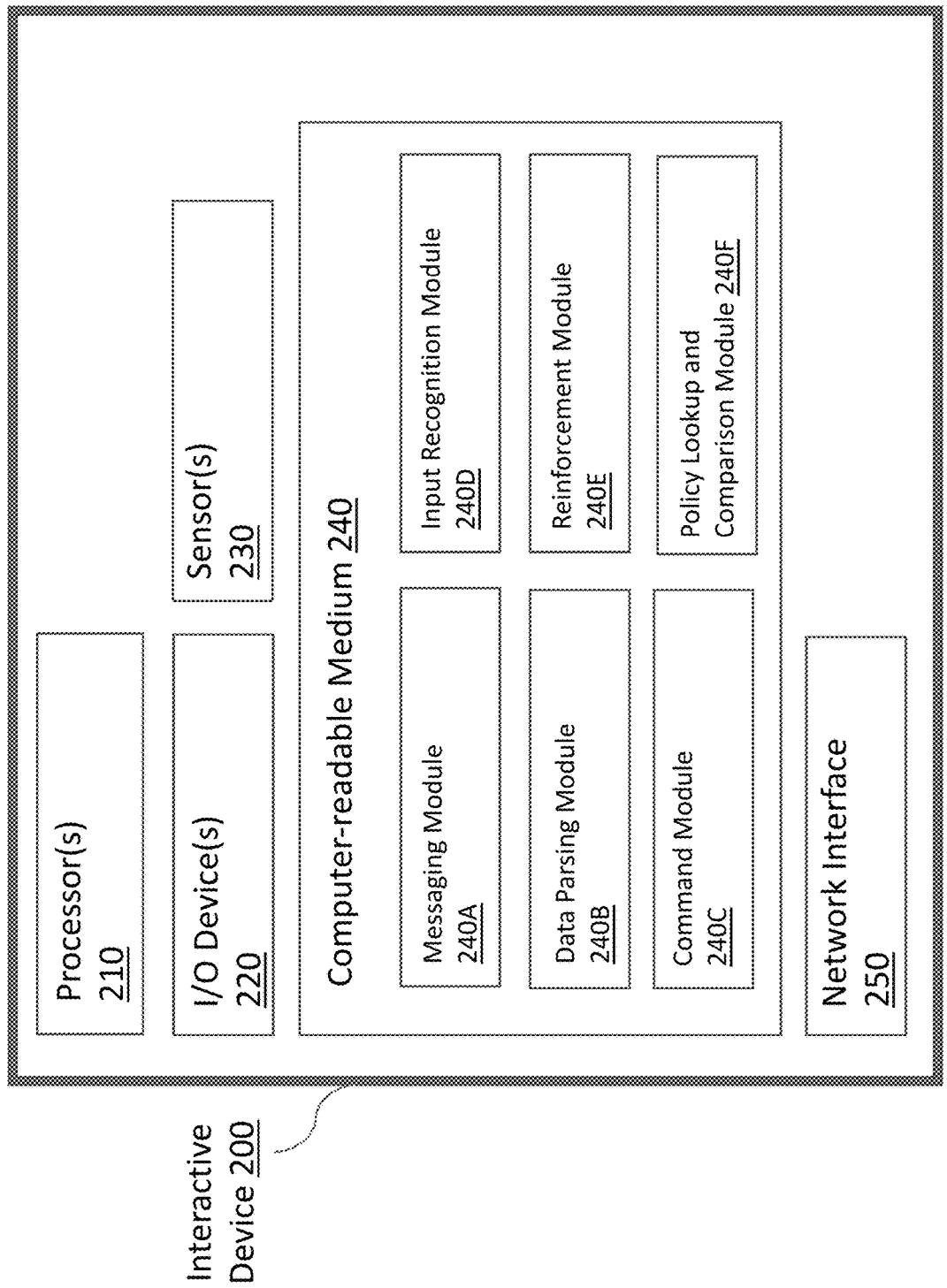
FIG. 2 shows a block diagram of an exemplary interactive device according to an embodiment.

FIG. 2 shows a block diagram of an exemplary interactive device. Interactive device 200 may be a toy or other connected device for outputting a customized response for a given input. This may include interactive devices 131, 132, 133, 134, 135, 136, and 137 of FIG. 1, for example. Interactive device 200 comprises one or more processor(s) 210, one or more input and output (I/O) device(s) 220, one or more sensor(s), at least one computer-readable medium 240, and at least one network interface 250. Network interface 250 can be an interface for communicating over any suitable communication networks or communications means implemented in embodiments, such as wired and/or wireless connectivity to WiFi, Bluetooth, NFC, RFID, etc. The one or more processors 210 can include any suitable electronic circuitry used for processing and executing instructions as known in the art. For example, the one or more processors 210 can include individual or combinations of central processing units (CPUs), graphics processing units (GPUs), microprocessors, microcontrollers, in addition to any I/O peripherals/interfaces thereof. The one or more processors 210 may perform input/output operations and exchange information with the one or more I/O devices(s) 220.

I/O device(s) 220 may include various input devices for receiving user inputs as known by those in the art, such as push buttons, switches, knobs, pull strings, other mechanical input devices, microphones, touch interfaces, as well as various known output devices, such as speakers, image displays, mechanical feedback devices, and combination input/output devices, such as touchscreens, etc. These may further include actuation devices, such as those used for performing toy functions (e.g. motors, light emitting diodes, etc.). Sensor(s) 230 may include devices for detecting and measuring environmental stimuli, such as sound, light, and other properties. For example, sensors(s) 230 may include one or more of an audio sensor such as microphones or microphone arrays, mechanical sensors such as pressure sensors, torque sensors, etc., inertial measurement sensors such as accelerometers, magnetometers, gyro sensors, GPS or other positioning sensor, and/or any number of optical sensors such as cameras, UV, and IR sensors, as well as any other electromagnetic radiation detection devices. It is noted that any one of sensor(s) 230 can also function as an input device of I/O device(s) 220. Further, network interface 250 can also act as an I/O device of I/O device(s) 220 and/or as a sensor of sensor(s) 230.

The processor 210 and the computer-readable medium 240 provide computing functionality to the device 200. The computer-readable medium 240 may a component for storing instructions (e.g. machine code, byte code, or other computer code, herein referred to as "program code") executable by processor 210. The computer-readable medium can be one or more memory devices, such as, for example, Random Access Memory (RAM), Read Only Memory (ROM), flash memory, or any other type of volatile or non-volatile storage medium that includes instructions that the processor 210 may execute.

The computer-readable medium 240 generally includes program code for receiving at least one broadcast message, determining a highest priority identifier amongst the plurality of identifiers received in the at least one broadcast message, identifying a command sequence associated with the highest priority identifier, and executing the command sequence.

The program code is generally described as various functional "applications" or "modules" within the computer-readable medium 240, although alternate implementations may have different functions or combinations of functions. The computer-readable medium 240 also generally includes data structures that may store information for use by the various program code modules also stored thereon.

The computer-readable medium 240 may comprise a messaging module 240A, data parsing module 240B, command module 240C, input recognition module 240D, reinforcement module 240E, and policy lookup and comparison module 240F. Messaging module 240A comprises instructions for sending, receiving, formatting, and reformatting messages. This can include instructions for receiving a broadcast message comprising a plurality of identifiers. The broadcast message can be a short-distance advertising message, and each identifier can be stored as an allocated set of bits contained in merchant-specific data fields. The instructions can further include broadcasting a reinforcement request message and receiving a reinforcement response message.

Data parsing module 240B comprises instructions for analyzing data messages and parsing or separating them into their syntactic components. Parsing can be performed according to a predefined format or set of rules. This can include instructions for determining a highest priority identifier amongst a plurality of identifiers received in a broadcast message. In one implementation, the instructions for determining the highest priority identifier may include instructions for identifying a packlet in the broadcast message, parsing the packlet into a plurality of identifiers, comparing a format of the plurality of identifiers in the packlet to a predefined hierarchy, and determining the highest priority identifier amongst the plurality of identifiers based on the comparison of the plurality of identifiers to the predefined hierarchy.

Command module 240C comprises instructions for executing commands. This may include instructions for identifying a command sequence associated with a highest priority identifier received in a broadcast message, and executing the command sequence. Command module 240C may further comprise instructions for receiving programming instructions from a programming device and associating uniquely identified command sequences with uniquely identified inputs based on the programming instructions. Input recognition module 240D comprises instructions for detecting, recognizing, and identifying inputs. This may include instructions for sensing a user action and/or recognizing one or more features of sensor data associated with the user action.

Reinforcement module 240E comprises instructions for executing a reinforcement policy. This can include instructions for adjusting, modifying, and updating reinforcement values associated with actions and responses. The instructions can further include determining an identifier for the user action, sensing a user response to an executed command sequence associated with the user action, determining if the user response is positive or negative, and adjusting a reinforcement value associated with the command sequence. Policy lookup and comparison module 240F comprises instructions for determining a policy programmed in memory and comparing relevant information to the policy in a process. The process can be a process for determining a response to an input, and the relevant information can be identifiable information relating to the input. Policies can be policies for determining a highest priority identifier based on a level of information specificity and/or based on reinforcement values. Policy lookup and comparison module 240F may further comprise instructions for applying command sequence identifiers and associated reinforcement values to a predefined policy. In one implementation, policy lookup and comparison module 240F may further comprise instructions for applying additional criteria to determine if and/or how to respond to an input. For example, the additional criteria may include a signal strength criteria and/or last similar response criteria.

FIG. 3 shows a depiction of programmable instructions according to an embodiment. The depiction shown is portrayed as a database table, where each programmable instruction is stored as a row that associates or links data elements categorized in columns, although it should be understood that this depiction is merely for illustrative purposes, and other structures for storing programmable data in memory can be used. The programmable data can include data elements for an input type 301, input identifier or input ID 302, command sequence identifier or command sequence ID 303, command sequence or action 304, reinforcement value 305, last update 306, and count 307.

Input type 301 may include data elements for categorical types of input detectable by an I/O device and/or sensor. Examples may include a 'broadcast' input type relating to inputs received over a network interface, 'gesture' input type relating to movements or gestures detected from video, 'touch' input type relating to inputs sensed through touch, pressure, etc., 'image' input type relating to an image recognized from image data, 'audio' input type relating to recognized audio signatures, speech, voice signatures, noise, etc., among others.

Input ID 302 includes data elements that uniquely identify inputs. For example, the data elements may specify a set of bit values or other form of unique identifier, or simply a unique phrase describing the input. Command sequence ID 303 includes data elements for uniquely identifying command sequences. For example, for each unique combination and order of commands programmed together in sequence, a unique identifier can be generated and assigned. Action 304 includes data elements for specifying a sequence of commands associated with a command sequence identifier. These may include specific control functions performed by the device's actuators and/or output devices and/or specific commands for retrieving and outputting media content, sound bites, etc.

Reinforcement value 305 includes data elements for reinforcement values associated with a programmed instruction.

For example, the data elements may be scores or other probabilistic measures associated with a particular input-output combination. The scores can be adjusted based on feedback, such as determinations that a user's reaction is positive or negative. Last update 306 may include data elements for recording a time that programming instructions were last modified/updated. For example, the data elements can include timestamps recorded in a standardized time or standard format. Count 307 may include data elements for how many times a given programming instruction has been executed. For example, the data elements can include integer values that are modified whenever a particular program instruction, input, or command sequence has been encountered and/or performed.

Looking at some specific examples shown, program instruction 310 is an instruction to emit a blue light and output a 'princess greet' soundbite whenever a broadcast containing identifiers 'x03 x02' (franchise: Fairy tale, Grouping: Princess) is received. Program instruction 320 is an instruction to emit a red light and output audio for "Hi, princess no. 2" whenever a broadcast specifically containing identifiers 'x03 x02 x02' (franchise: Fairytale, Grouping: Princess, Character: Princess No. 2) is received. Program instruction 330 is an instruction to broadcast a request for an appropriate action when a gesture involving a person waving his or her hand has been detected. Program instruction 340 is an instruction to output a "weak roar" when a 'belly rub' touch input has been sensed. Program instruction 350 is an instruction to run up to "user X" and actuate a "wag tail" motion when the facial features of user X have been detected from an image sensor. Program instruction 360 is an instruction to execute command sequence 4 and command sequence 1 intermittently in response to receiving one broadcast. Program instruction 370 is an instruction to perform specific output functions (LED lights, motors) with specific parameters (flash delay, motor speed/power, timing, etc.) in response to receiving another broadcast. It is noted that the programming instructions shown in FIG. 3 and described herein are just a few non-limiting examples, and that any number of similar programming instructions may be implemented, as appreciated by one skilled in the art.

Figure 4:
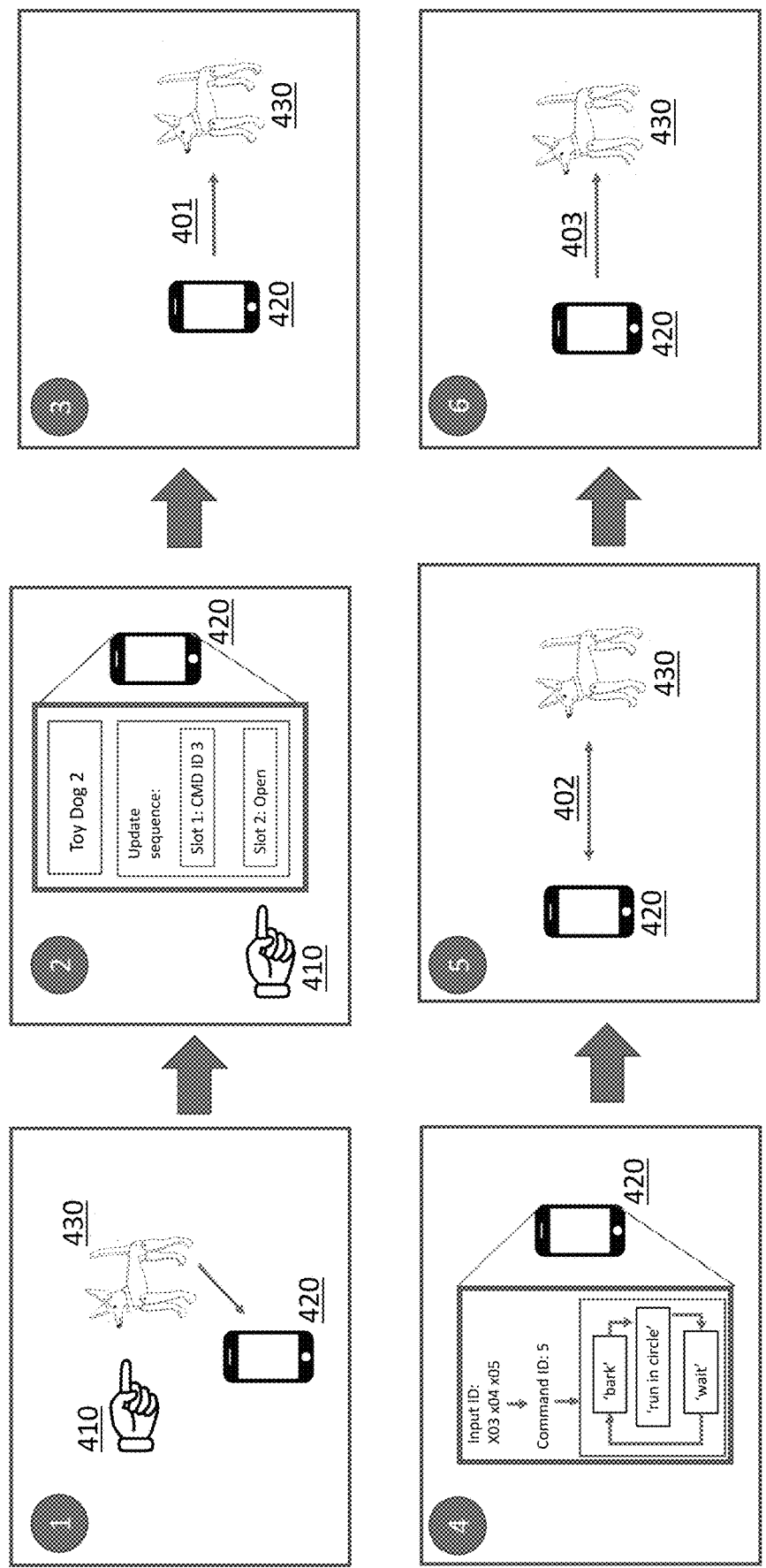
FIG. 4 shows an illustration of a process for programming/modifying a command sequence in a device.

FIG. 4 shows an illustration of a process of programming/modifying a command sequence for a device. It should be understood that the devices, toys, and interfaces shown are merely illustrative, and in other implementations, can be expressed in other forms for carrying out the process described herein. As shown in FIG. 4, a handheld device is used as a programming device 420, and a toy is programmed as the interactive device 430. The programming device 420 may be, for example, programming device 121 of FIG. 1, and the interactive device 430 may be interactive device 133 of FIG. 1 and/or interactive device 200 of FIG. 2. The instructions are programmed by a user 410 who may be, for example, user 110 of FIG. 1.

In step 1, the user initiates the programming process. This may comprise launching a corresponding programming application on the programming device 420. In one implementation, the programming process can be initiated by way of physical access to the interactive device 430. For example, a push button on the toy can be pressed and held for a period of time (e.g. five seconds) at which point, the toy may communicate with the interactive device 430 to grant programming access and deliver any pertinent information, such as the current characteristics and the current programming settings, program instructions of the toy, etc., to the programming device 420.

In step 2, the user 410 views programming instructions and/or settings relating to the interactive device 430 and makes a selection to begin the process of programming a new set of instructions. For example, the programming device may display identifiable information of the toy and may further present selections to program a new command sequence/input combination, so that the toy can respond to a specified input accordingly.

In step 3, the programming device sends a 'START SEQUENCE ID' command 401 to the interactive device 430. This command 401 may communicate to the interactive device 430 that the next set of delivered information relates to a series of commands to program as a response associated with a particular input.

In step 4, the user 410 selects the input and command sequence combination. The inputs are uniquely identified by an input ID and the command sequences are uniquely identified by a command sequence ID. In one implementation, the programming device may only display a phrase or other text relating to the inputs and commands when presenting selections to the user through the application. The application can register selections as unique identifiers corresponding to the text.

In step 5, the programming device 420 communicates a series of commands 402 to update the interactive device 430. In one implementation, the programming device 420 may communicate each command in the order they are to be executed. For example, the interactive device 430 can send a plurality of data packets, the first corresponding to 'bark', followed by 'run in circle', 'wait', and then finally a 'repeat' command signifying that the last sequence in the command is to repeat the previous three commands.

In step 6, the programming device 420 sends a 'STOP SEQUENCE' command 403 to the interactive device 430. This indicates to the interactive device 430 that all of the commands in the programmed sequence have been transmitted and to associate the command sequence with the input selected by the user 410. The interactive device then associates the command sequence ID with the input ID of the user-selected input. The input ID can be specific bit values receivable in an advertising message, and the interactive device 430 may be configured to respond to the advertisement by executing the programmed command sequence associated therewith.

Figure 5:
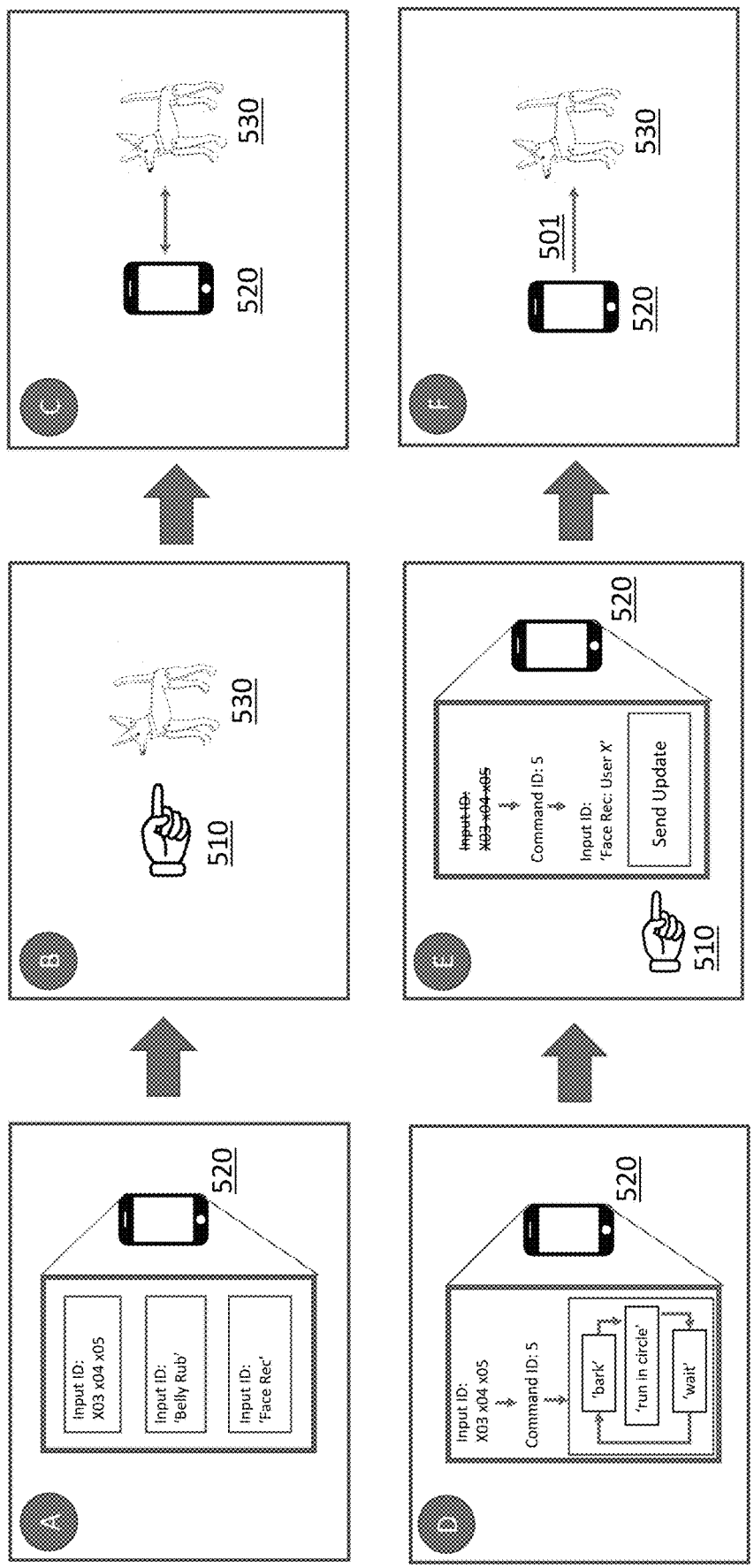
FIG. 5 shows an illustration of a process for programming/modifying an input trigger to command sequence association in a device.

FIG. 5 shows an illustration of a process for programming/modifying an input trigger to command sequence association in a device. The user 510, programming device 520, interactive device 530, may be the same user 410, programming device 420, interactive device 430 of FIG. 4 respectively. Similarly, the user 510, programming device 520, interactive device 530, and interface shown may take a number of suitable forms for carrying out the process outlined herein, as will be appreciated by a person of skill in the art. For example, the interactive device 520 may be interactive device 200 of FIG. 2.

In step A, the programming device 520 displays information relating to available programming. In FIG. 5, the information displayed by the programming device 520 is depicted as available input triggers that can be associated with command sequences, although it is noted that in other implementations the information can instead be command sequences available for programming, or, in other implementations may be combinations of input triggers and command sequences. The information can be displayed as graphical objects selectable by the user, where each selection represents a uniquely identified input trigger/command sequence. For example, the graphical objects can include selections for 'Belly rub' signifying a specific touch input and 'Face rec' signifying an input of recognizing the user's face from image data. When a user makes a selection, the programming device 520 can register the selection as a particular input identifier. The selections shown may be specific to the interactive device 530 that the user 510 wishes to program. In other implementations, the selections shown may be general selections or the entirety of selections that are available to choose from. For example, the selections may be a loaded list made available to users by content creators, such as from a virtual store interface provided on an application running on the programming device 520.

In step B, the user 510 initiates the update/modification process with the interactive device 530. In one implementation, this process can be initiated by securing physical access to the interactive device 530, such as by holding down a button on the interactive device 530 or providing some other corresponding input.

In step C, the interactive device 530 communicates programming information with the programming device 520 and grants programming access. For example, the programming information can include the current associations between inputs and command sequences programmed into the interactive device 530. In one implementation, granting programming access may entail exchanging verification/authentication information over a secure communications channel between the interactive device 530 and the programming device 520.

In step D, the programming device 520 displays the programming information. In step E, the user 510 makes changes in associations between input identifiers and command sequence identifiers, which the programming device 520 may send as an update to the interactive device 530. In step F, the programming device 520 sends the update message 501 to the interactive device 530 so that the interactive device 530 may store the changes in memory.

Figure 6:
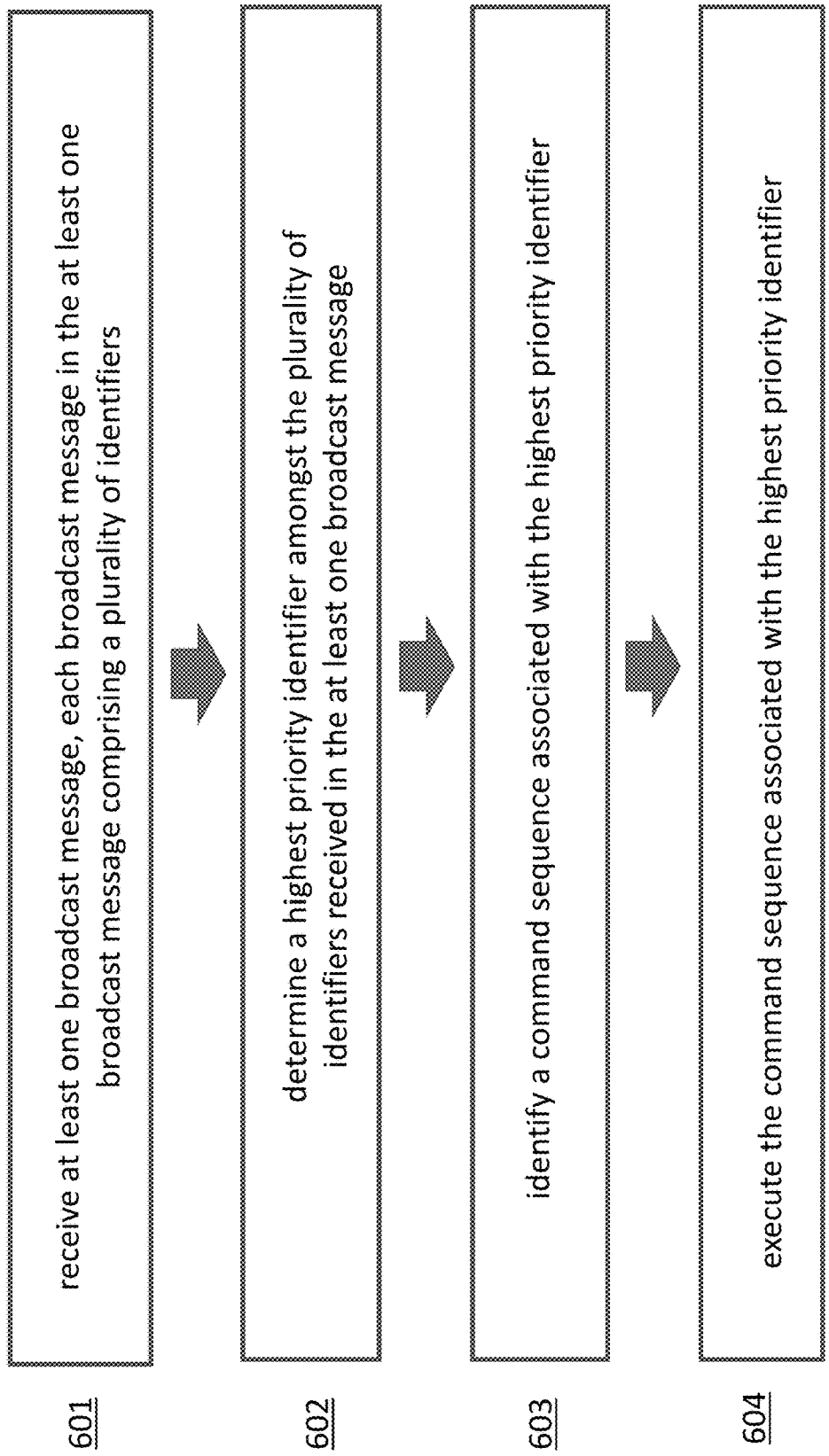
FIG. 6 shows a flow diagram of a method according to one embodiment.

FIG. 6 shows a flow diagram of a method according to one embodiment. The method 600 may be implemented by a suitable interactive device as previously described (e.g. interactive device 200 of FIG. 2).

In step 601, the interactive device receives at least one broadcast message. Each broadcast message in the at least one broadcast message comprises a plurality of identifiers. For example, the interactive device may receive a BLE beacon containing a packlet of bit sets, where each bit set may correspond to an identifier when considering its context, relation to other bit sets in the beacon, and a predefined policy specified for the packlet. In one implementation, the predefined policy may specify that each bit set corresponds to one or more of a brand identifier, a franchise identifier, a character archetype identifier, a family identifier, a character identifier, and an interactor type identifier.

In step 602, the interactive device determines a highest priority identifier amongst the plurality of identifiers received in the at least one broadcast message. For example, highest priority may be evaluated against a predefined policy specifying how each of the bit sets should be compared against one another to determine the appropriate response. This may be based on hierarchy and/or reinforcement, as previously described. As such, the interactive device will always be able to output some form of response when encountering an input, and is equipped with means to decide on the best response if more than one input is encountered at substantially the same time.

In step 603, the interactive device identifies a command sequence associated with the highest priority identifier. For example, associations between command sequence identifiers and input identifiers, including the highest priority input identifier, may be stored in memory. The associations can include those programmed into the interactive device by a user in a customized manner, according to the methods earlier described. In step 604, the interactive device executes the command sequence associated with the highest priority identifier. A simple example of a command sequence is where each command corresponds to a control output for actuators or similar output device of the interactive device (e.g. sounds, motor functions, light patterns, etc.).

Figure 7:
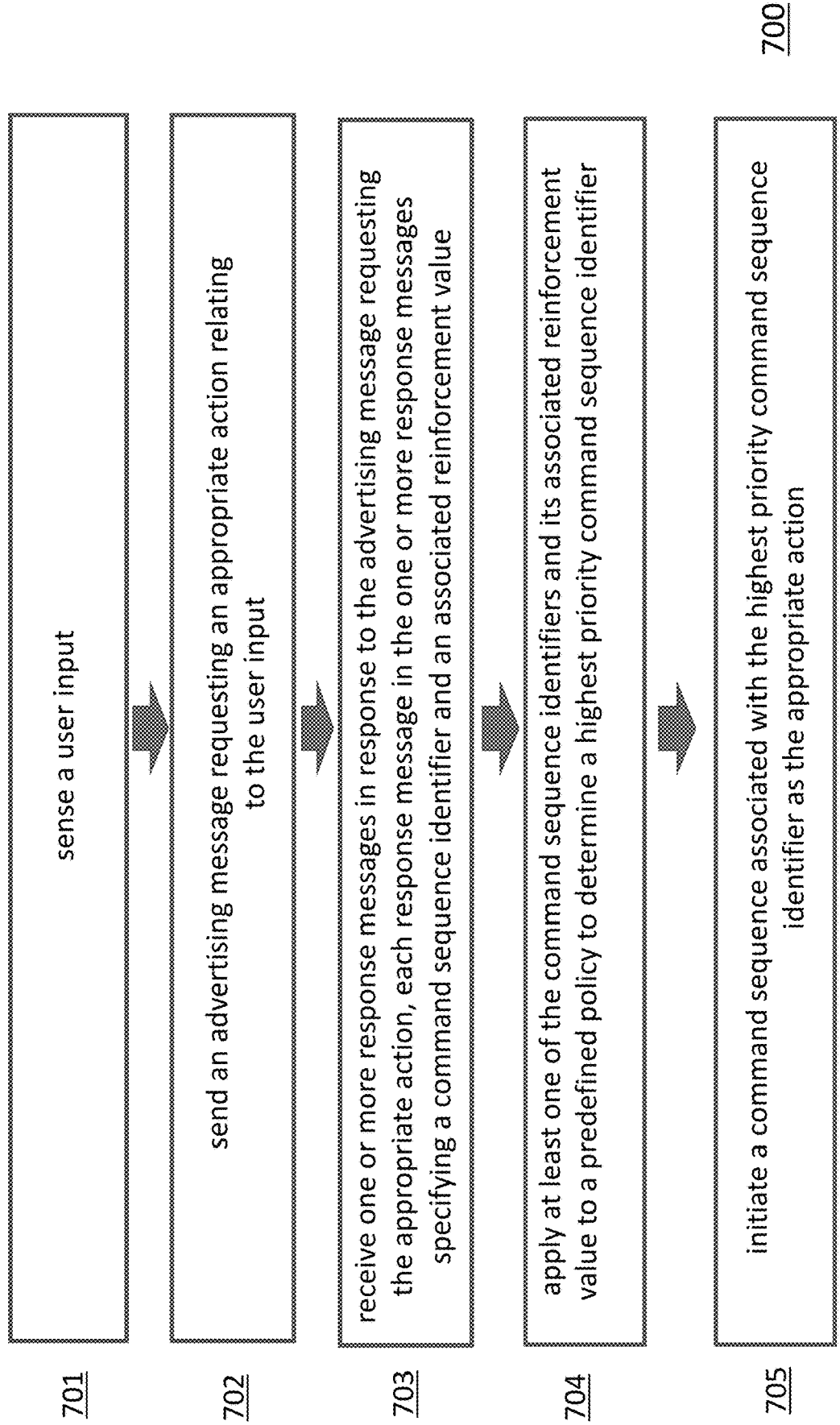
FIG. 7 shows a flow diagram of a method according to another embodiment.

FIG. 7 shows a flow diagram of a method according to another embodiment. Again, method 700 may be performed by a suitable interactive device, such as interactive device 200 of FIG. 2.

In step 701, the interactive device senses a user input. For example, the interactive device may register/recognize a particular input trigger from sensor data or features from sensor data, such as inputs corresponding to specific gestures, touch inputs, or voice commands spoken by the user, or even a recognition of features of the user himself/herself, such as recognition of the user's face from image data.

In step 702, the interactive device sends an advertising message that requests an appropriate action relating to the user input. For example, the interactive device may be a toy that queries other toys for how to best respond to the user. The advertising message may be a BLE message that includes an indication that a query for action is being made as well as an indication of the user input in question.

In step 703, the interactive device receives one or more response messages in response to the advertising message requesting the appropriate action. Each response message in the one or more response messages specifies a command sequence identifier and an associated reinforcement value. Following the previous example, each toy that is queried can respond back with an identifier for a highly reinforced action and any additional information such as reinforcement value, timestamps, counters, etc., that the interactive device may find useful in determining the best action amongst the plurality of responses.

In step 704, the interactive device applies at least one of the command sequence identifiers and its associated reinforcement value to a predefined policy to determine a highest priority command sequence identifier. For example, the predefined policy may be a voting system that specifies how to count recommended actions.

In step 705, the interactive device initiates a command sequence associated with the highest priority command sequence identifier as the appropriate action. For example, the highest priority command sequence identifier may be "command sequence no. 2", which is associated with a sequence 'bark'+'play dead'. 'Bark' and 'play dead' may correspond to a set of output device functions, such as 'play audio from speaker: bark' and 'motor speed 5, clockwise, stop, motor speed 1, counterclockwise, stop'.

Method 700 can also include sensing a user response to the command sequence, determining if the user response is positive or negative, and adjusting a reinforcement value associated with the command sequence. Reinforcement values can also be dampened over time. For example, method 700 can further include evaluating a timestamp associated with a reinforcement value adjustment, comparing the timestamp to a current time and a predetermined time duration. Based on the comparison of the timestamp to the current time and to the predetermined time duration, the interactive device can reverse the reinforcement value adjustment in memory. For example, the timestamp may be from 5 days ago, at which point the interactive device is programmed to reverse any reinforcement value changes. Older actions may be considered "stale", and as such, any reinforcement information associated with said actions have become irrelevant to the current expectations of the user.

Embodiments described provide a number of technical advantages. As previously mentioned, standard short-distance messages, such as BLE advertising messages, are of limited size. Meanwhile, typical unique identifiers, such as UUIDs usually take up a considerable amount of space (e.g. 16 bytes). In prior systems, this limited the amount of information that could be conveyed in an advertisement. Embodiments herein provide a means of broadcasting and registering a greater amount of identifiable information to allow for more complex and interactive responses in connected devices. In preferred embodiments, the format of information is identifiable and communicable on an order of bits. This format can take the form of pre-allocated bits within already available manufacturer-specific data fields that are provided by advertising messaging standards, and thus, the format is easily incorporated into existing infrastructure for short-distance beaconing. Furthermore, responses can be finetuned according to user reinforcement and based on reinforcement information aggregated from other devices nearby. This provides a simplified method of reinforcement-based programming that is less data intensive than other reinforcement techniques, such as those relying on complex predictive modeling, heavily trained, heavily layered learning networks, and the like.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Furthermore, although some embodiments may achieve advantages over other possible solutions or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim (s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatus (systems) and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the flowchart illustrations or block diagram block or blocks.

The computer program instructions may also be loaded onto a computer, other programmable data processing apparatus, or other device to cause a series of operational steps to be performed on the computer, other programmable apparatus or other device to produce a computer implemented process such that the instructions which execute on the computer or other programmable apparatus provide processes for implementing the functions/acts specified in the flowchart illustrations or block diagram block or blocks.

The flowchart illustrations and block diagrams in the Figures illustrate the architecture, functionality, and operation of possible implementations of systems, methods and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
receiving at least one broadcast message, each broadcast message in the at least one broadcast message comprising a plurality of identifiers;
identifying a packlet in the at least one broadcast message;
parsing the packlet into the plurality of identifiers;
comparing a format of the plurality identifiers in the packlet to a predefined hierarchy;
determining a highest priority identifier amongst the plurality of identifiers based on the comparison of the plurality of identifiers to the predefined hierarchy;
identifying a command sequence associated with the highest priority identifier; and
executing the command sequence.

2. The method of claim 1, wherein the at least one broadcast message is a short-distance advertising message, and wherein each identifier is stored as an allocated set of bits contained in merchant-specific data fields of the short-distance advertising message.

3. The method of claim 1, wherein the highest priority identifier is determined based on a level of information specificity associated with each identifier in the plurality of identifiers.

4. The method of claim 1, wherein the plurality of identifiers comprises one or more of: a brand identifier, a franchise identifier, a character archetype identifier, a family identifier, a character identifier, and an interactor type identifier.

5. The method of claim 1, wherein the highest priority identifier is determined based on evaluation criteria relating to one or more reinforcement values associated with each identifier in the plurality of identifiers.

6. A method comprising:
sensing a user action;
determining an identifier for the user action, the user action being associated with a range of possible command sequences to execute;
broadcasting a reinforcement request message, the reinforcement request message relating to a query for one or more reinforcement values relating to the user action and the range of possible command sequences to execute associated with the user action;
receiving at least one broadcast message, each broadcast message in the at least one broadcast message comprising a plurality of identifiers;
determining a highest priority identifier amongst the plurality of identifiers received in the at least one broadcast message;
identifying a command sequence associated with the highest priority identifier; and
executing the command sequence, wherein the highest priority identifier is determined based on evaluation criteria relating to the one or more reinforcement values.

7. The method of claim 6, further comprising:
sensing a user response to the command sequence;
determining if the user response is positive or negative; and
adjusting a reinforcement value associated with the command sequence.

8. The method of claim 6, further comprising:
evaluating a timestamp associated with a reinforcement value adjustment;
comparing the timestamp to a current time and a predetermined time duration; and
reversing the reinforcement value adjustment based on the comparing.

9. An interactive response system comprising:
at least one processor;
at least one network interface;
a non-transitory computer-readable medium storing instructions, the instructions including a method, the method comprising:
receiving at least one broadcast message, each broadcast message in the at least one broadcast message comprising a plurality of identifiers;
identifying a packlet in the at least one broadcast message;
parsing the packlet into the plurality of identifiers;
comparing a format of the plurality of identifiers in the packlet to a predefined hierarchy;
determining a highest priority identifier amongst the plurality of identifiers based on the comparison of the plurality of identifiers to the predefined hierarchy;
identifying a command sequence associated with the highest priority identifier; and
executing the command sequence.

10. The interactive response system of claim 9, wherein the at least one broadcast message is a short-distance advertising message, and wherein each identifier is stored as an allocated set of bits contained in merchant-specific data fields of the short-distance advertising message.

11. The interactive response system of claim 9, wherein the highest priority identifier is determined based on a level of information specificity associated with each identifier in the plurality of identifiers.

12. The interactive response system of claim 9, wherein the plurality of identifiers comprises one or more of a franchise identifier, a character archetype identifier, a family identifier, a character identifier, and an interactor type identifier.

13. The interactive response system of claim 9, wherein the highest priority identifier is determined based on evaluation criteria relating to one or more reinforcement values associated with each identifier in the plurality of identifiers.

14. An interactive response system comprising:
at least one processor;
at least one network interface;
at least one sensor;
a non-transitory computer readable medium storing instructions, the instructions including a method, the method comprising:
sensing a user action using the at least one sensor;

determining an identifier for the user action, the user action being associated with a range of possible command sequences to execute;

broadcasting a reinforcement request message, the reinforcement request message relating to a query for one or more reinforcement values relating to the user action and the range of possible command sequences to execute associated with the user action;

receiving at least one broadcast message, each broadcast message in the at least one broadcast message comprising a plurality of identifiers;

determining a highest priority identifier amongst the plurality of identifiers received in the at least one broadcast message;

identifying a command sequence associated with the highest priority identifier; and executing the command sequence, wherein the highest priority identifier is determined based on evaluation criteria relating to the one or more reinforcement values.

15. The interactive response system of claim 14, wherein the method further comprises:

sensing a user response to the command sequence;

determining if the user response is positive or negative; and adjusting a reinforcement value associated with the command sequence.

16. The interactive response system of claim 14, wherein the interactive response system is a character-based toy or a device executing a character-based virtual assistant.

17. A method comprising:

sensing a user input;

sending an advertising message requesting an appropriate action relating to the user input;

receiving, one or more response messages in response to the advertising message requesting the appropriate action, each response message in the one or more response messages specifying a command sequence identifier and an associated reinforcement value;

applying at least one of the command sequence identifiers and its associated reinforcement value to a predefined policy to determine a highest priority command sequence identifier; and initiating a command sequence associated with the highest priority command sequence identifier as the appropriate action.

18. The method of claim 17, wherein the user input comprises one or more identifiable features of sensor data recognized as being associated with a user.

19. The method of claim 17, wherein the advertising message is a short-distance advertising message.

20. The method of claim 17, further comprising:

sensing a user response to the command sequence;

determining if the user response is positive or negative; and adjusting a reinforcement value associated with the command sequence.

* * * * *